«12» United States Patent
Huang et al.

(10) Patent No.: US 10,455,369 B2
(45) Date of Patent: Oct. 22, 2019

(54) SUBSCRIPTION REQUIREMENT INDICATION FOR SERVICE

(71) Applicant: Intel IP Corporation, Santa Clara, CA (US)

(72) Inventors: Po-Kai Huang, West Lafayette, IN (US); Elad Oren, Tel Aviv (IL); Emily H. Qi, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 276 days.

(21) Appl. No.: 15/194,233

(22) Filed: Jun. 27, 2016

(65) Prior Publication Data

US 2017/0245120 A1    Aug. 24, 2017

Related U.S. Application Data

(60) Provisional application No. 62/298,059, filed on Feb. 22, 2016.

(51) Int. Cl.
*H04W 4/06* (2009.01)
*H04L 12/18* (2006.01)

(52) U.S. Cl.
CPC .............. *H04W 4/06* (2013.01); *H04L 12/185* (2013.01); *H04L 12/189* (2013.01)

(58) Field of Classification Search
CPC ....... H04W 4/06; H04L 12/185; H04L 12/189
See application file for complete search history.

(56) References Cited

U.S. PATENT DOCUMENTS

| 2014/0325224 | A1* | 10/2014 | Grube | H04L 63/0272 713/168 |
| 2016/0112984 | A1* | 4/2016 | Patil | H04W 68/005 455/458 |
| 2016/0286574 | A1* | 9/2016 | Abraham | H04L 63/065 |
| 2016/0374107 | A1* | 12/2016 | Das | H04L 65/4076 |

* cited by examiner

*Primary Examiner* — Jackie Zuniga Abad
(74) *Attorney, Agent, or Firm* — Schwegman Lundberg & Woessner, P.A

(57) ABSTRACT

A STA and method of providing a subscription policy are provided. The STA determines a subscription policy for a multicast, broadcast or unicast service and provides a policy comprising an indication that indicates active subscription (i.e. group joining is required) or no subscription (i.e. group joining is prohibited) or implicit subscription (i.e. group joining is implicit), dependent on network or subscription conditions. Updates to the policy are transmitted upon one or more thresholds are being reached. Subscribers re-subscribe to the service when the indication switches from implicit subscription to active subscription.

18 Claims, 8 Drawing Sheets

SUBSCRIPTION REQUIREMENT INDICATION FOR SERVICE

PRIORITY CLAIM

This application claims the benefit of priority to U.S. Provisional Patent Application Ser. No. 62/298,059, filed Feb. 22, 2016, and entitled "SUBSCRIPTION REQUIREMENT INDICATION FOR SERVICE," which is incorporated herein by reference in its entirety.

TECHNICAL FIELD

Embodiments pertain to wireless communications. Some embodiments relate to wireless local area networks (WLANs) and Wi-Fi networks including networks operating in accordance with the IEEE 802.11 family of standards, such as the IEEE 802.11ac standard, the IEEE 802.11ax study group (SG) (named DensiFi) or IEEE 802.11ay. Some embodiments relate to multicast/unicast service support provided by Wi-Fi Aware 2.0.

BACKGROUND

The use of personal communication devices has increased astronomically over the last two decades. The penetration of mobile devices (also referred to as stations (STAs) or user equipment) in modern society has continued to drive demand for a wide variety of networked devices in a number of disparate environments. The use of networked STAs using a variety of communication protocols has increased in all areas of home and work life. The STAs may be provided one of a number of different types of service, including unicast (STA to STA communication) and multicast (one or more publishers to multiple subscribers). Multicast service, however, has added layers of complexity, at least in part due to the potential use of both active and passive subscriptions. Due to the different types of subscriptions, it may be difficult to determine to determine the amount of traffic at any point. It would be beneficial to design a subscription policy that permits a publisher to more easily keep track of subscribers subscribing to a particular service.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
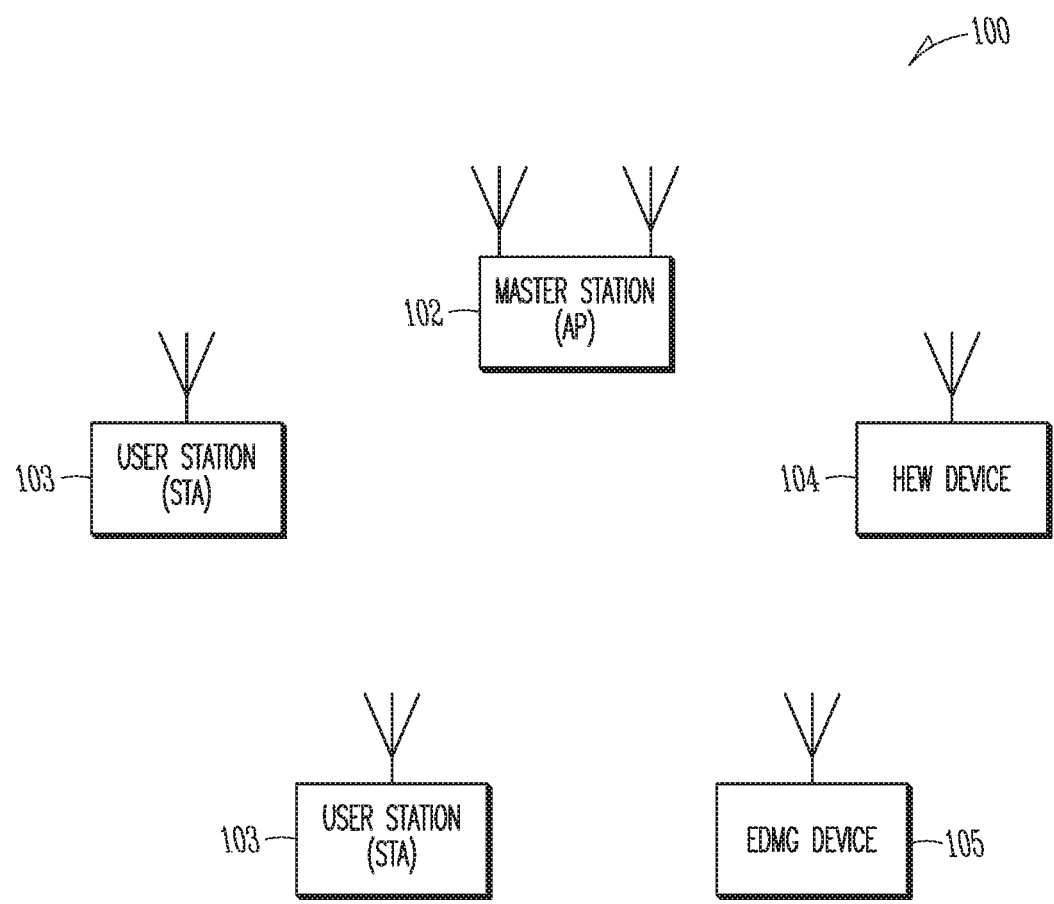
FIG. 1 is a wireless network in accordance with some embodiments.

FIG. 1 illustrates a wireless network in accordance with some embodiments. In The network 100 may be an Enhanced Directional Multi Gigabit (EDMG) network, a High Efficiency Wireless Local Area Network (HEW) network, and/or a Wireless Local Area Network (WLAN) or a Wi-Fi network. As an example, the network 100 may support EDMG devices in some cases, non EDMG devices in some cases, and a combination of EDMG devices and non EDMG devices in some cases. As another example, the network 100 may support HEW devices in some cases, non HEW devices in some cases, and a combination of HEW devices and non HEW devices in some cases. As another example, some devices supported by the network 100 may be configured to operate according to EDMG operation and/or HEW operation and/or legacy operation. Accordingly, it is understood that although techniques described herein may refer to a non EDMG device, an EDMG device, a non HEW device or an HEW device, such techniques may be applicable to any or all such devices in some cases.

The network 100 may include any number (including zero) of master stations (STA) 102, user stations (STAs) 103, HEW stations 104 (HEW devices), and EDMG stations 105 (EDMG devices). Any of the STAs shown in FIG. 1 may act as a publisher and/or subscriber (also called source and sink, respectively). The master station 102 may be a stationary non-mobile device, such as an access point (AP). In some embodiments, the STAs 103 may be legacy stations. These embodiments are not limiting, however, as the STAs 103 may be HEW devices or may support HEW operation in some embodiments. In some embodiments, the STAs 103 may be EDMG devices or may support EDMG operation. It should be noted that embodiments are not limited to the number of master STAs 102, STAs 103, HEW stations 104 or EDMG stations 105 shown in the example network 100 in FIG. 1. The master station 102 may be arranged to communicate with the STAs 103 and/or the HEW stations 104 and/or the EDMG stations 105 in accordance with one or more of the IEEE 802.11 standards. In accordance with some HEW embodiments, an AP may operate as the master station 102 and may be arranged to contend for a wireless medium (e.g., during a contention period) to receive exclusive control of the medium for an HEW control period (i.e., a transmission opportunity (TXOP)). The master station 102 may, for example, transmit a master-sync or control transmission at the beginning of the HEW control period to indicate, among other things, which HEW stations 104 are scheduled for communication during the HEW control period. During the HEW control period, the scheduled HEW stations 104 may communicate with the master station 102 in accordance with a non-contention based multiple access technique. This is unlike conventional Wi-Fi communications in which devices communicate in accordance with a contention-based communication technique, rather than a non-contention based multiple access technique. During the HEW control period, the master station 102 may communicate with HEW stations 104 using one or more HEW frames. During the HEW control period, STAs 103 not operating as HEW devices may refrain from communicating in some cases. In some embodiments, the master-sync transmission may be referred to as a control and schedule transmission.

In some embodiments, a first STA 103 may transmit a grant frame to a second STA 103 to indicate a transmission of a data payload on primary channel resources or on secondary channel resources. The first STA 103 may receive an acknowledgement message for the grant frame from the second STA 103. The first STA 103 may transmit a data payload to the second STA 103 in the channel resources indicated in the grant frame. These embodiments will be described in more detail below.

In some embodiments, the multiple-access technique used during the HEW control period may be a scheduled orthogonal frequency division multiple access (OFDMA) technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique including a multi-user (MU) multiple-input multiple-output (MIMO) (MU-MIMO) technique. These multiple-access techniques used during the HEW control period may be configured for uplink or downlink data communications.

The master station 102 may also communicate with STAs 103 and/or other legacy stations in accordance with legacy IEEE 802.11 communication techniques. In some embodiments, the master station 102 may also be configurable to communicate with the HEW stations 104 outside the HEW control period in accordance with legacy IEEE 802.11 communication techniques, although this is not a requirement. The master station 102 may form a Basic Service Set (BSS) with the other STAs 103, 104, 105 having a BSSID and communicating using IEEE 802.11 protocols (using an IEEE 802.11a/b/g/n/ac or ax protocol) in a Wireless Local Area Network (WLAN) or Wi-Fi network.

In some embodiments, the HEW communications during the control period may be configurable to use one of 20 MHz, 40 MHz, or 80 MHz contiguous bandwidths or an 80+80 MHz (160 MHz) non-contiguous bandwidth. In some embodiments, a 320 MHz channel width may be used. In some embodiments, subchannel bandwidths less than 20 MHz may also be used. In these embodiments, each channel or subchannel of an HEW communication may be configured for transmitting a number of spatial streams.

In some embodiments, EDMG communication may be configurable to use channel resources that may include one or more frequency bands of 2.16 GHz, 4.32 GHz or other bandwidth. Such channel resources may or may not be contiguous in frequency. As a non-limiting example, EDMG communication may be performed in channel resources at or near a carrier frequency of 60 GHz.

In some embodiments, primary channel resources may include one or more such bandwidths, which may or may not be contiguous in frequency. As a non-limiting example, channel resources spanning a 2.16 GHz or 4.32 GHz bandwidth may be designated as the primary channel resources. As another non-limiting example, channel resources spanning a 20 MHz bandwidth may be designated as the primary channel resources. In some embodiments, secondary channel resources may also be used, which may or may not be contiguous in frequency. As a non-limiting example, the secondary channel resources may include one or more frequency bands of 2.16 GHz bandwidth, 4.32 GHz bandwidth or other bandwidth. As another non-limiting example, the secondary channel resources may include one or more frequency bands of 20 MHz bandwidth or other bandwidth.

In some embodiments, the primary channel resources may be used for transmission of control messages, beacon frames or other frames or signals by the AP 102. As such, the primary channel resources may be at least partly reserved for such transmissions. In some cases, the primary channel resources may also be used for transmission of data payloads and/or other signals. In some embodiments, the transmission of the beacon frames may be restricted such that the AP 102 does not transmit beacons on the secondary channel resources. Accordingly, beacon transmission may be reserved for the primary channel resources and may be restricted and/or prohibited in the secondary channel resources, in some cases.

Figure 2:
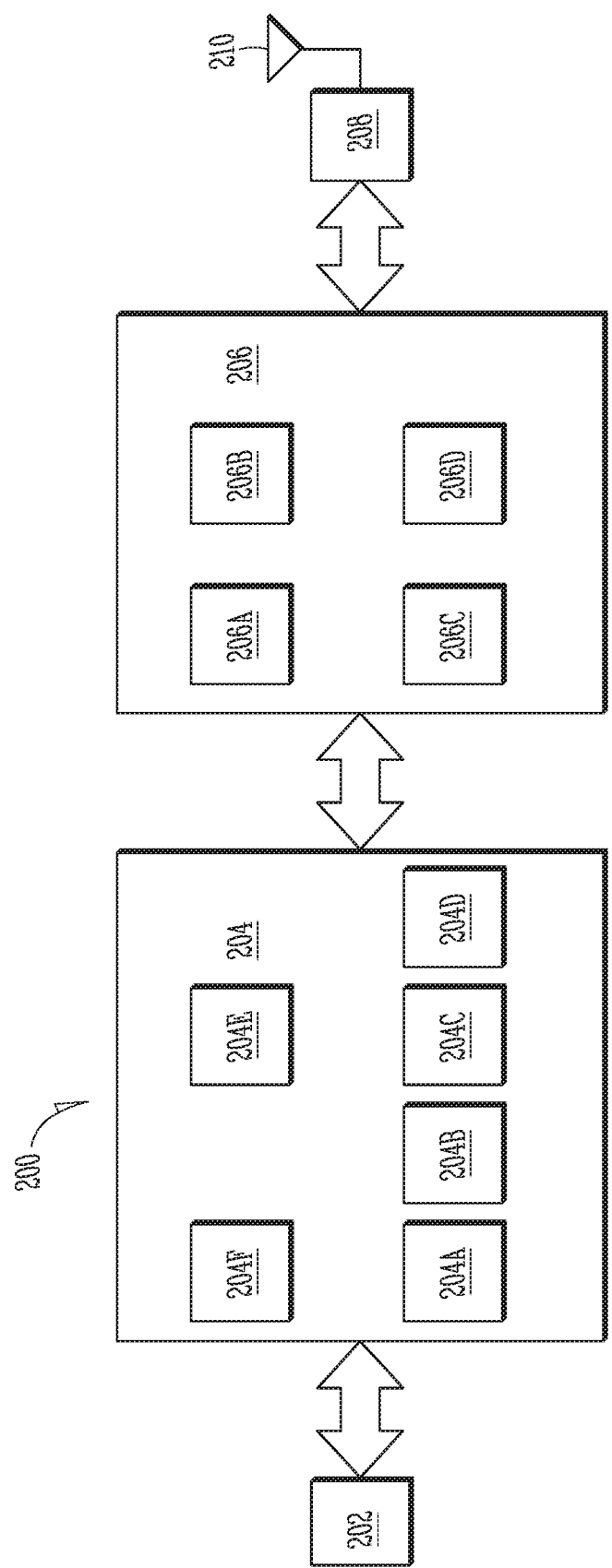
FIG. 2 illustrates components of a communication device in accordance with some embodiments.

Embodiments described herein may be implemented into a system using any suitably configured hardware and/or software. FIG. 2 illustrates components of a STA in accordance with some embodiments. At least some of the components shown may be used in an AP, for example, such as the STA 102 or AP 104 shown in FIG. 1. The application or processing circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 204 may include circuitry such as, but not limited to, one or more single-core or multi-core processors. The baseband circuitry 204 may include one or more baseband processors and/or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a second generation (2G) baseband processor 204*a*, third generation (3G) baseband processor 204*b*, fourth generation (4G) baseband processor 204*c*, and/or other baseband processor(s) 204*d* for other existing generations, generations in development or to be developed in the future (e.g., fifth generation (5G), 6G, etc.). The baseband circuitry 204 (e.g., one or more of baseband processors 204*a-d*) may handle various radio control functions that enable communication with one or more radio networks via the RF circuitry 206. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, and/or constellation mapping/demapping functionality. In some embodiments, encoding/decoding circuitry of the baseband circuitry 204 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 204e of the baseband circuitry 204 may be configured to run elements of the protocol stack for signaling of the PHY, MAC, RLC, PDCP and/or RRC layers. In some embodiments, the baseband circuitry may include one or more audio digital signal processor(s) (DSP) 204f. The audio DSP(s) 204f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry. In some embodiments, the STA 200 can be configured to operate in accordance with communication standards or other protocols or standards, including Institute of Electrical and Electronic Engineers (IEEE) 802.16 wireless technology (Wi-Max), IEEE 802.11 wireless technology (Wi-Fi) including 802.11 ax, various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, etc. technologies either already developed or to be developed.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the RF circuitry 206 may include a receive signal path and a transmit signal path. The receive signal path of the RF circuitry 206 may include mixer circuitry 206a, amplifier circuitry 206b and filter circuitry 206c. The transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c. The filter circuitry 206c may include a low-pass filter (LPF), although the scope of the embodiments is not limited in this respect.

In some embodiments, the mixer circuitry 206a of the receive signal path and the mixer circuitry 206a of the transmit signal path may include two or more mixers and may be arranged for quadrature downconversion and/or upconversion respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and/or direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

The synthesizer circuitry 206d may be configured to synthesize an output frequency for use by the mixer circuitry 206a of the RF circuitry 206 based on a frequency input and a divider control input. In some embodiments, the synthesizer circuitry 206*d* may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206*d* of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210.

In some embodiments, the FEM circuitry 208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210.

In some embodiments, the STA 200 may include additional elements such as, for example, memory/storage, display, camera, sensor, and/or input/output (I/O) interface as described in more detail below. In some embodiments, the STA 200 described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the STA 200 may include one or more user interfaces designed to enable user interaction with the system and/or peripheral component interfaces designed to enable peripheral component interaction with the system. For example, the STA 200 may include one or more of a keyboard, a keypad, a touchpad, a display, a sensor, a non-volatile memory port, a universal serial bus (USB) port, an audio jack, a power supply interface, one or more antennas, a graphics processor, an application processor, a speaker, a microphone, and other I/O components. The display may be an LCD or LED screen including a touch screen. The sensor may include a gyro sensor, an accelerometer, a proximity sensor, an ambient light sensor, and a positioning unit. The positioning unit may communicate with components of a positioning network, e.g., a global positioning system (GPS) satellite.

The antenna 210 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 210 may be effectively separated to take advantage of spatial diversity and the different channel characteristics that may result.

Although the STA 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Figure 3:
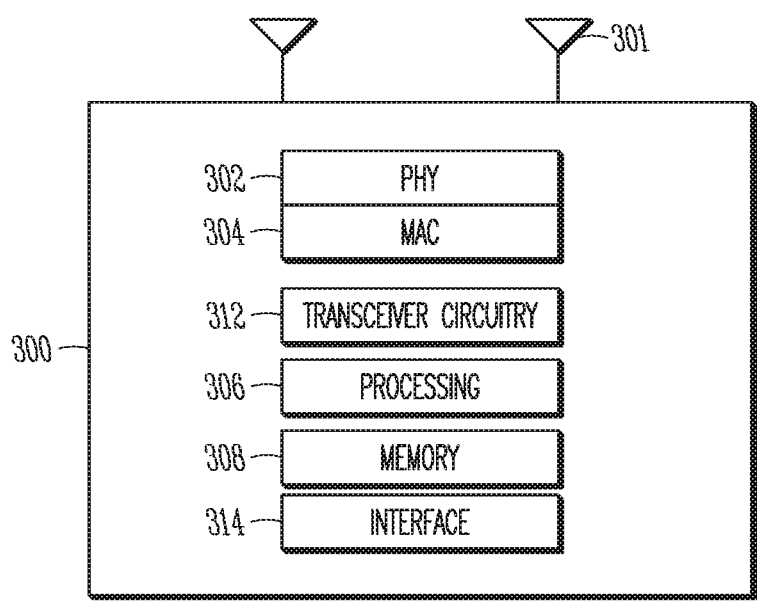
FIG. 3 illustrates a block diagram of a communication device in accordance with some embodiments.

FIG. 3 is a block diagram of a communication device in accordance with some embodiments. The device may be a STA or AP, for example, such as the STA 102 or AP 104 shown in FIG. 1. The communication device 300 may include physical layer circuitry 302 and transceiver circuitry 312 for transmitting and receiving signals to and from one or more APs, STAs or other devices using one or more antennas 301. The communication device 300 may also include medium access control layer (MAC) circuitry 304 for controlling access to the wireless medium. The communication device 300 may also include processing circuitry 306, such as one or more single-core or multi-core processors, and memory 308 arranged to perform the operations described herein. The communication device 300 may also include wired and/or wireless interfaces 310 to communicate with components external to the network. The physical layer circuitry 302, MAC circuitry 304 and processing circuitry 306 may handle various radio control functions that enable communication with one or more radio networks compatible with one or more radio technologies. The radio control functions may include signal modulation, encoding, decoding, radio frequency shifting, etc. For example, similar to the device shown in FIG. 2, in some embodiments, communication may be enabled with one or more of a WMAN, a WLAN, and a WPAN. In some embodiments, the communication device 300 can be configured to operate in accordance with 3GPP standards or other protocols or standards, including WiMax, Wi-Fi, GSM, EDGE, GERAN, UMTS, UTRAN, or other 3G, 3G, 4G, 5G, etc. technologies either already developed or to be developed. The physical layer circuitry 202, MAC layer circuitry 304, transceiver circuitry 312, processing circuitry 308, memory 308 and interfaces 310 may be separate components or may be part of a combined component.

The antennas 301 may comprise one or more directional or omnidirectional antennas, including, for example, dipole antennas, monopole antennas, patch antennas, loop antennas, microstrip antennas or other types of antennas suitable for transmission of RF signals. In some MIMO embodiments, the antennas 301 may be effectively separated to take advantage of spatial diversity and the different channel characteristics that may result.

Although the communication device 300 is illustrated as having several separate functional elements, one or more of the functional elements may be combined and may be implemented by combinations of software-configured elements, such as processing elements including DSPs, and/or other hardware elements. For example, some elements may comprise one or more microprocessors, DSPs, FPGAs, ASICs, RFICs and combinations of various hardware and logic circuitry for performing at least the functions described herein. In some embodiments, the functional elements may refer to one or more processes operating on one or more processing elements. Embodiments may be implemented in one or a combination of hardware, firmware and software. Embodiments may also be implemented as instructions stored on a computer-readable storage device, which may be read and executed by at least one processor to perform the operations described herein.

In some embodiments, the communication device 300 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly.

In some embodiments, the communication device 300 may communicate using OFDM communication signals over a multicarrier communication channel. Accordingly, in some cases the communication device 300 may be configured to receive signals in accordance with specific communication standards, such as the Institute of Electrical and Electronics Engineers (IEEE) standards including IEEE 802.11-2012, 802.11n-2009 and/or 802.11ac-2013 standards and/or proposed specifications for WLANs including proposed HEW standards, although the scope of the embodiments is not limited in this respect as they may also be suitable to transmit and/or receive communications in accordance with other techniques and standards. In some other embodiments, the communication device 300 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In accordance with embodiments, the communication device 300 may transmit an SM-OFDM signal that comprises multiple OFDM signals, and the SM-OFDM signal may be received at the communication device 300. The SM-OFDM signal may be transmitted in channel resources that comprise multiple sub-carriers and the OFDM signals may be based at least partly on data symbols for used data portions of the sub-carriers. The used data portions may be based on a first portion of encoded bits and the data symbols for the used data portions may be based on a second portion of the encoded bits. In some examples, the used data portions of the sub-carriers may be different for at least some of the OFDM signals.

In some embodiments, the channel resources may be used for downlink transmission and for uplink transmissions by the communication device 300. That is, a time-division duplex (TDD) format may be used. In some cases, the channel resources may include multiple channels, such as the 20 MHz channels previously described. The channels may include multiple sub-channels or may be divided into multiple sub-channels for the uplink transmissions to accommodate multiple access for multiple communication devices 300. The downlink transmissions may or may not utilize the same format.

In some embodiments, the downlink sub-channels may comprise a predetermined bandwidth. As a non-limiting example, the sub-channels may each span 2.03125 MHz, the channel may span 20 MHz, and the channel may include eight or nine sub-channels. Although reference may be made to a sub-channel of 2.03125 MHz for illustrative purposes, embodiments are not limited to this example value, and any suitable frequency span for the sub-channels may be used. In some embodiments, the frequency span for the sub-channel may be based on a value included in an 802.11 standard (such as 802.11ax), a 3GPP standard or other standard.

In some embodiments, the sub-channels may comprise multiple sub-carriers. Although not limited as such, the sub-carriers may be used for transmission and/or reception of OFDM or OFDMA signals. As an example, each sub-channel may include a group of contiguous sub-carriers spaced apart by a pre-determined sub-carrier spacing. As another example, each sub-channel may include a group of non-contiguous sub-carriers. That is, the channel may be divided into a set of contiguous sub-carriers spaced apart by the pre-determined sub-carrier spacing, and each sub-channel may include a distributed or interleaved subset of those sub-carriers. The sub-carrier spacing may take a value such as 78.125 kHz, 312.5 kHz or 15 kHz, although these example values are not limiting. Other suitable values that may or may not be part of an 802.11 or 3GPP standard or other standard may also be used in some cases. As an example, for a 78.125 kHz sub-carrier spacing, a sub-channel may comprise 26 contiguous sub-carriers or a bandwidth of 2.03125 MHz.

Figure 4:
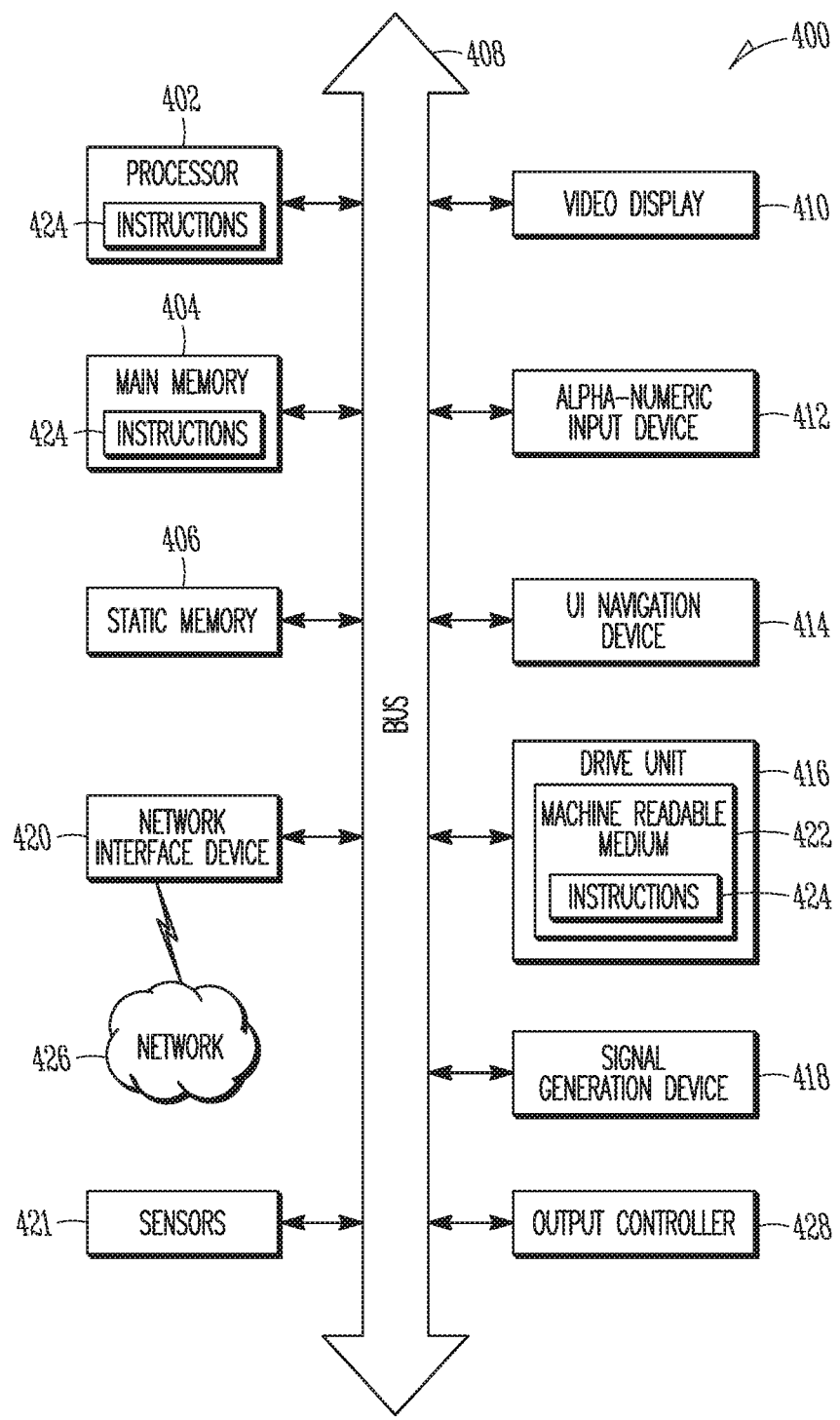
FIG. 4 illustrates another block diagram of a communication device in accordance with some embodiments.

FIG. 4 illustrates another block diagram of a communication device in accordance with some embodiments. In alternative embodiments, the communication device 400 may operate as a standalone device or may be connected (e.g., networked) to other communication devices. In a networked deployment, the communication device 400 may operate in the capacity of a server communication device, a client communication device, or both in server-client network environments. In an example, the communication device 400 may act as a peer communication device in peer-to-peer (P2P) (or other distributed) network environment. The communication device 400 may be an AP or a STA such as a PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The communication device 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The communication device 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The communication device 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a communication device readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the communication device 400. In an example, one or any combination of the hardware processor 402, the main memory 404, the static memory 406, or the storage device 416 may constitute communication device readable media.

While the communication device readable medium 422 is illustrated as a single medium, the term "communication device readable medium" may include a single medium or multiple media (e.g., a centralized or distributed database, and/or associated caches and servers) configured to store the one or more instructions 424.

The term "communication device readable medium" may include any medium that is capable of storing, encoding, or carrying instructions for execution by the communication device 400 and that cause the communication device 400 to perform any one or more of the techniques of the present disclosure, or that is capable of storing, encoding or carrying data structures used by or associated with such instructions. Non-limiting communication device readable medium examples may include solid-state memories, and optical and magnetic media. Specific examples of communication device readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device readable media may include non-transitory communication device readable media. In some examples, communication device readable media may include communication device readable media that is not a transitory propagating signal.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., IEEE 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), MIMO, or multiple-input single-output (MISO) techniques. In some examples, the network interface device 420 may wirelessly communicate using Multiple User MIMO techniques. The term "transmission medium" shall be taken to include any intangible medium that is capable of storing, encoding or carrying instructions for execution by the communication device 400, and includes digital or analog communications signals or other intangible medium to facilitate communication of such software.

As above, any of the STAs shown in FIGS. 1-4 may act as a unicast or multicast publisher or subscriber. Wi-Fi Aware 2.0 initiatives from the Wi-Fi Aware IEEE group to provide multicast/unicast service support are ongoing. In Wi-Fi Aware 2.0, STAs may be publishers, subscribers, or both. Publishers may persistently broadcast a signal that indicates permission to connect. Subscribers persistently search for publishers, and when found, may initiate a connection request. In Neighborhood Awareness Network (NAN) STAs may specifically advertise services provided and groups to other STAs are permitted join as well as discovering services offered by other, proximate STAs. To this end, STAs in a NAN network may provide frames for a variety of network functions. The frames may include action frames that, among others, permit network synchronization for STAs and subscription frames that permit advertisement and discovery of various multicast and unicast services, as well as beacon frames that advertise the presence of the NAN network. One or more STAs may set up a NAN Data Path (NDP) with one or more other STAs for service delivery, either directly or through an intermediary such as an AP with a NAN Data Link (NDL) for the schedule.

Figure 5:
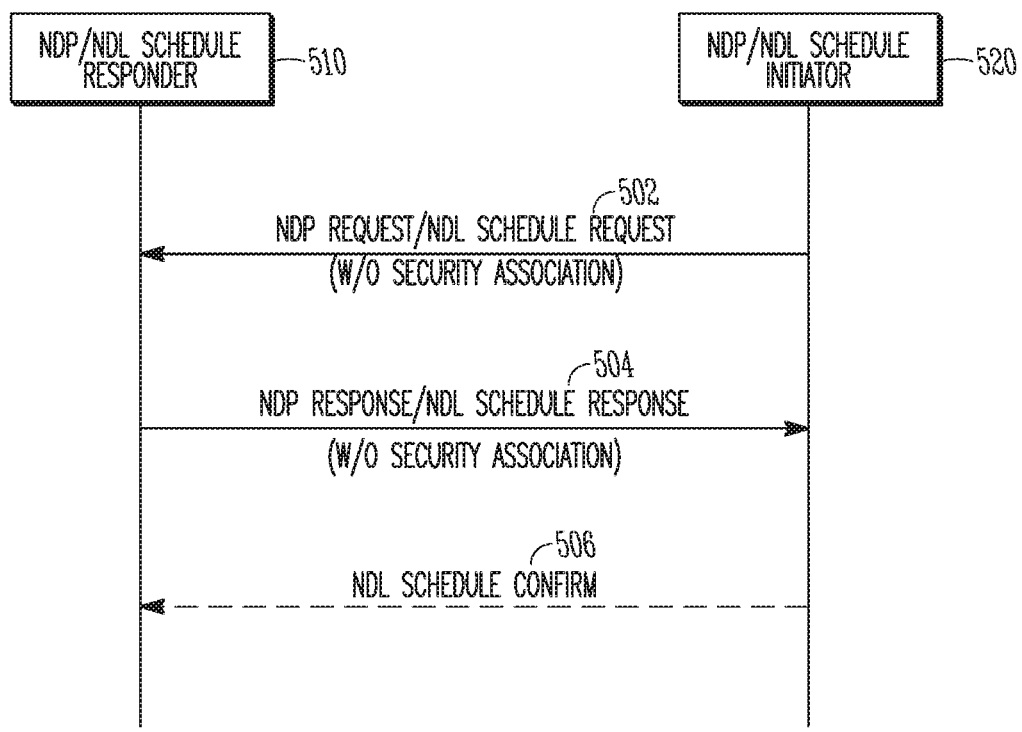
FIG. 5 illustrates unicast scheduling in accordance with some embodiments.

For unicast service support, two STAs may form data connection and negotiate schedules to communicate with each other. FIG. 5 illustrates unicast scheduling in accordance with some embodiments. A NDP/NDL initiator STA 510 and a NDP/NDL responder STA 520 may exchange a series of communications to schedule a unicast service. In particular, the NDP/NDL initiator STA 510 may transmit a NDP request or NDL schedule request 502 to a NDP/NDL responder STA 520. The request 502 may thus be transmitted from a subscriber to a publisher. The request 502 may or may not use a security association, such as being encoded using a private key. Whether security is used may depend on characteristics of the NDP/NDL initiator STA 510, a NDP/NDL responder STA 520, or content to be provided by the NDP/NDL initiator 510. In response to the request 502, the NDP/NDL responder STA 520 may transmit a NDP response or NDL schedule response 504 to the NDP/NDL initiator STA 510. The response 504, similarly, may or may not use any security association, which again may be dependent on the above characteristics. The NDP/NDL initiator STA 510, having received the response 504, may transmit a NDL schedule confirmation 506 to the NDP/NDL responder 510. In some embodiments, the NDP/NDL initiator STA 510 may avoid transmitting the confirmation 506.

Figure 6:
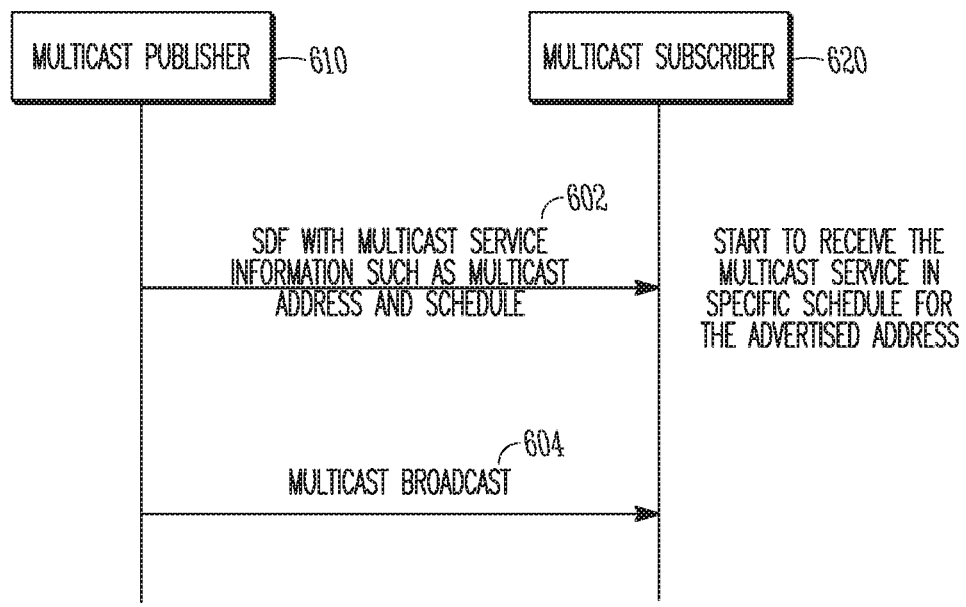
FIG. 6 illustrates passive multicast scheduling in accordance with some embodiments.

Multicast service is different from unicast service as a subscription of multicast publisher by a multicast subscriber may avoid a negotiation such as that shown in FIG. 5. This may be accomplished by using passive subscription. FIG. 6 illustrates passive multicast scheduling in accordance with some embodiments. In passive subscription, a multicast publisher 610 may broadcast scheduling information in a service discovery frame (SDF) 602 for any potential multicast subscriber to receive. A multicast subscriber 620 may merely subscribe to an address used by the multicast publisher 610 and receive the scheduled multicast data automatically. The address may be for a particular individual stream of multicast data, each of which provides a different service, a bundled set of streams or for all streams. The multicast publisher 610 may broadcast the stream information, e.g., a list of the addresses and corresponding streams. For example, after signing up using the address for a particular service, the multicast publisher 610 may provide multicast news and the multicast subscriber 620 may simply receive the news when multicast by the multicast publisher 610.

The multicast publisher 610 may also have more control of the schedule setup for the various multicast streams as the traffic may only originate from a single point—the multicast publisher. This is to say that the communications may be one way communications rather than two way communications. The multicast publisher 610 may be responsible for keeping track of the multicast subscribers 620 that have subscribed to the different multicast streams to maintain reliability of the multicast service to the multicast subscribers 620. In some embodiments, however, this may be more easily determined and controlled than through the use of an active subscription exchange with the multicast subscribers 620, notably when multiple multicast publishers 610 provide the same multicast service in a many-to-many multicast.

Figure 7:
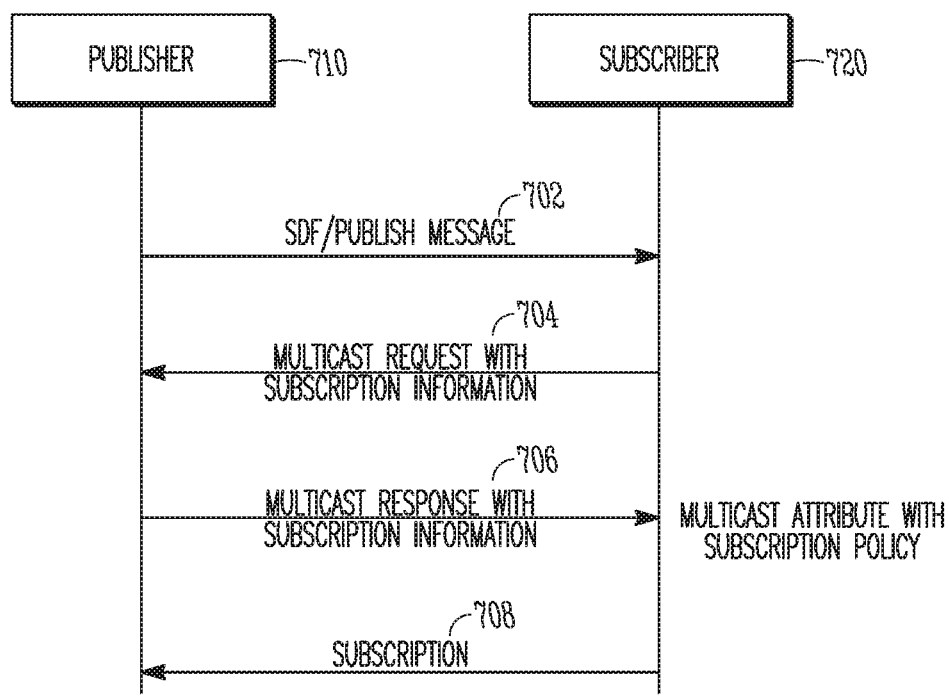
FIG. 7 illustrates active multicast scheduling in accordance with some embodiments.
Figure 8:
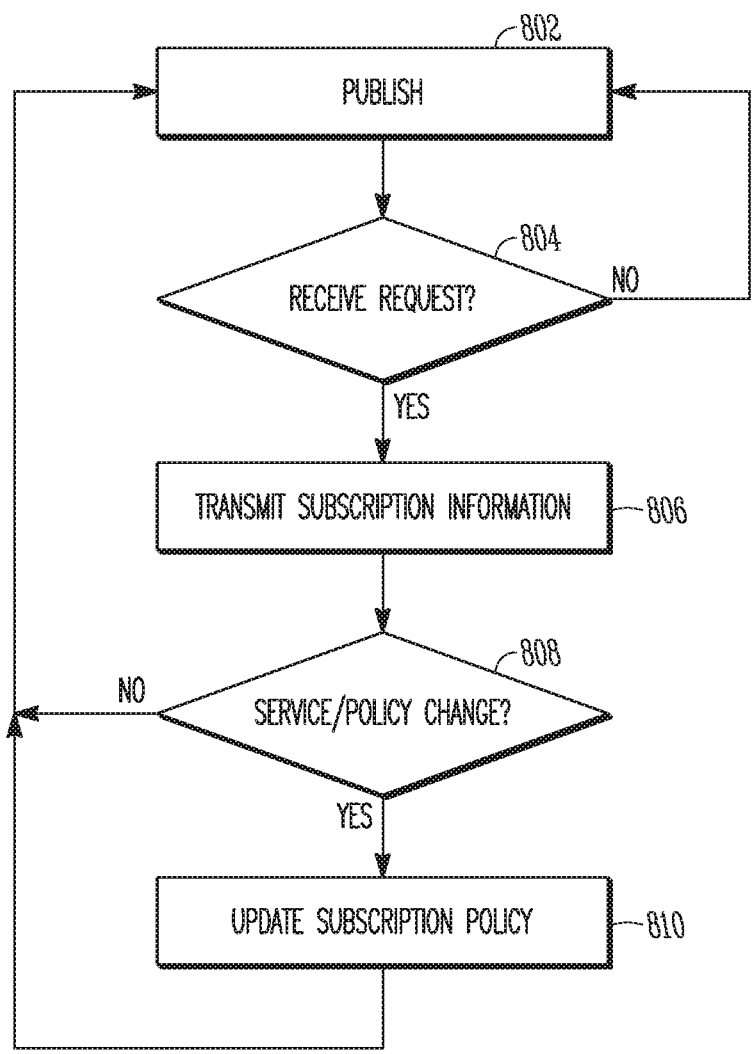
FIG. 8 illustrates a flowchart for establishing a multicast subscription in accordance with some embodiments.

FIG. 7 illustrates active multicast scheduling in accordance with some embodiments. FIG. 8 illustrates a flowchart for establishing a multicast subscription in accordance with some embodiments. Multiple elements may be present in FIG. 7, including a publisher 710 and a subscriber 720 that receives multicast service. The publisher may provide one or more types of services, including multicast, broadcast or unicast services, the type of which may indicate a particular type of subscription available. In the embodiment shown in FIG. 7, the publisher 710 may be a multicast publisher that provides a multicast service and the subscriber 720 may be a multicast subscriber that receives the multicast service.

As shown in FIG. 8, at operation 802, the publisher 710 may provide an indication of the available service to the subscriber 720 in a service discovery frame (SDF) 702 or unicast transmission. The advertisement may contain a subscription policy that indicates a subscription type for the subscriber 720 to obtain the service from the publisher 710. In some embodiments, the advertisement or message may include in addition to an identification of the service and subscription policy, a schedule. The message containing the schedule may be transmitted, for example, in Further Availability Window advertised by the publisher 710. In some embodiments, the advertisement 702 containing the subscription policy may be published by the publisher 710 at regular intervals. In some embodiments, the advertisement 702 containing the subscription policy may be broadcast at times that are dependent on other conditions, e.g., based on the number of STAs or subscribers (increasing with increasing number of STAs or subscribers) located near the publisher 710 or in communication with the publisher 710. The publication message may contain the service schedule or, in some embodiments, the schedule may be provided to a subscriber in response to a request from the subscriber.

The subscriber 720 may receive the advertisement and determine whether it wishes to subscribe to the service. The subscriber 720 may display the subscription information on a display and wait for user interaction to make the determination or, in some circumstances, the user may have already provided to the subscriber 720 an indication to subscribe to the service. In response to determining that the service is desired, the subscriber 720 may examine the subscription policy extracted from the advertisement and determine the manner of subscription. In the embodiment, the subscriber 720 may determine that the subscription policy indicates that active subscription is required or implicit subscription is allowed, for example. In this case, the subscriber 720 may transmit at multicast request with subscription information to the publisher 710. The request 702 may be for an individual stream of multicast data, for a bundled set of streams or for all streams. At operation 804, the publisher 710 may determine whether a request in response to the advertisement of the service has been received from a subscriber 720.

If a request has not been received from the subscriber 720, the publisher 710 may not provide the service (if a minimum number of subscribers is not present) or may continue to provide the service based on a particular schedule for the service. The publisher 710 may, as above, return to operation 802 and periodically advertise the service. In response to receiving a request 704 from the subscriber 720, the publisher 710 may at operation 806 transmit a response 706. As above, the request 704 and response 706 may be, respectfully a multicast request and response. The response 706 may, for example, contain schedule information (or updated schedule information) and/or updated subscription policy for the service. The subscription policy may be contained within a multicast attribute. The subscriber 720 may, in other embodiments, transmit a subscription request 708 in response to receiving the response 706.

In many-to-many multicast embodiments, the multicast publisher 710 may not be the only publisher of the multicast data. In such embodiments, the multicast publisher 710 may start a multicast group that can be used for extension to a multicast group with multiple multicast publishers. The initiating multicast publisher may control scheduling of the multicast service provided by the many-to-many multicast group for other multicast publishers that join the multicast group. Such a multicast group may employ security such as private key exchange when subscribing. In some embodiments, the security may be linked to subscribing via a particular multicast publisher or may be linked to the multicast group. In the former case, only multicast subscribers subscribing via an unsecure multicast publisher, may employ the security or may employ a heighted security requirement, while multicast subscribers subscribing via a secure multicast publisher may avoid use of the security requirement or may use a lesser security. Active subscription may be part of a group joining process or part of a general multicast request and response frame exchange.

Due to security issues, for example, active subscription may be preferred for certain multicast groups or multicast publishers. Embodiments in which every multicast subscriber is to perform active subscription may, however, be problematic for multicast subscribers for which passive subscription is more desirable from a power or efficiency standpoint. For example, machine type communication (MTC) devices or STAs whose battery life is relatively low may prefer to use passive rather than active subscription to reduce the number of communications and thus power drain. In addition, in embodiments in which only active subscription is used, every multicast subscriber transmits a multicast request for subscription to one or more multicast publishers. This may create a substantial amount of signaling for subscription and un-subscription, which may use a similar process as subscription. Moreover, while embodiments in which each multicast subscriber itself decides whether to use active subscription may lead to a reduced amount of traffic, this may also lead to reduced control by the multicast publisher as the multicast publisher may not have sufficient knowledge to determine whether at least one multicast subscriber is subscribed to the multicast group. This may be an issue as, if no multicast subscribers are present, the multicast publisher may merely waste power and bandwidth that may be better used elsewhere as the multicast transmissions from the multicast publisher may be effectively useless due to the lack of STAs receiving the broadcast. Similarly, a unicast service may also want to stop other potential unicast subscriber STAs from subscribing to a unicast service due to one or more of the unicast publisher or unicast subscriber reaching a maximal service limit.

The publisher 710 may at operation 808 determine whether the services and/or policies change. Thus, either the policy for a previously indicated subscription may change or new services may be provided or existing services removed by the publisher 710. A server that provides the multicast data to the network or other network equipment may determine whether an update is to be performed and instructs the publisher 710 to make the update. The update may be based on device or network related changes, such as the number of subscribers or quality of service (QoS) provided for the subscribers exceeding or falling below one or more thresholds.

In response, the publisher 710 may update the subscription policy at operation 810. The subscription policy may be updated immediately or periodically as services and/or policies change. Whether or not the subscription policy 804 has been updated, the subscription policy may be periodically transmitted in an advertisement or directly to subscribers 720 in some embodiments. The subscriber 720 may either automatically listen for the periodic subscription policy transmissions updates or a broadcast message may be transmitted to request that the subscriber 720 listen at a predetermined time for the next one or more updates.

For a multicast publisher, whether or not a frame exchange between multicast publisher 710 and multicast subscriber 720 is to be used may be indicated by the subscription policy. The indication can be used for a subscription by the multicast subscriber 720, or for a multicast group joining if the subscription is the same as the multicast group joining. The subscription policy may indicate subscription type (unicast, multicast, broadcast) and policy. The subscription policy may indicate which of at least three different policies is in effect for a particular subscription: active subscription (i.e., frame exchange for group joining is required or group joining is required), implicit subscription (i.e., frame exchange for group joining is not required or group joining is implicit) and no subscription (i.e., frame exchange for group joining is prohibited or group joining is prohibited), also referred to as (active) subscription prohibited. The subscription policy may use a two or more bits to indicate the particular subscription policy in the above embodiment. In other embodiments, subscription/group joining may be limited to only being required or prohibited, in which case a single bit may be used. The subscription policy may differ for different services offered by the publisher 710 or may be dependent on the publisher 710 such that all services offered by the publisher 710 have the same subscription policy. In some embodiments, further subscription-related indications may be available. In some embodiments, an active time period may be associated with the subscription policy or particular services within the subscription policy. Thus, the indications in the subscription policy may be periodically updated and the subscribers regularly receive and determine the subscription policy.

As above, once the subscription policy has been provided to the subscriber 720, the subscriber 720 may employ the appropriate subscription policy for the desired subscription through transmission of a subscription transmission to the publisher 710. In an embodiment in which the indication in the subscription policy indicates active subscription to a multicast service is required, the multicast subscriber 720 may perform a frame exchange with the multicast publisher 710 to subscribe to the multicast service. Thus, the subscription transmission may include the frame exchange. This may prevent transmission of the multicast service by the multicast publisher 710 when no multicast subscriber is present. The subscription policy may be the same as the multicast group joining policy. Active subscription may be a default policy when the publisher 710 is a unicast publisher.

In another embodiment, the indication in the subscription policy may indicate that active subscription is not required. In this case, the multicast subscriber 720 may determine whether or not to perform the active subscription process (frame exchange). This may permit a multicast subscriber 720 to decide to avoid additional signaling and instead use passive subscription. On the other hand, the active subscription process may be used by the multicast subscriber 720 upon determination by the multicast subscriber 720 to actively subscribe to join a multicast group.

In another embodiment, the indication in the subscription policy may indicate that subscription is prohibited. In this case, the multicast subscriber 720 may not be able to perform active subscription with the multicast publisher 710. Consequently, the multicast subscriber 720 may remain using passive subscription. This may, for example, allow the multicast publisher 710 to prevent excessive signaling from multiple multicast subscribers to reduce network traffic. However, this may be useful in certain situations, such as only if a broadcast service is provided from the multicast publisher 710 and no subscription is required. It may also be useful if a unicast service publisher has reached a predetermined limit for providing service. One example of such a scenario is a printer that may not be able to accept any printing jobs.

As above, the signaling in the subscription policy for the indication can be 1 or 2 bits, dependent on the embodiment. The signaling can be carried in a multicast attribute, such as that shown in Table 1. In some embodiments, the multicast attribute can be the same as the attribute for a multicast group. The multicast attribute can be carried in a SDF, NAN management frame, or any public action frame used for multicast request and multicast response. One example of a subscription policy is provided in Table 1, below.

TABLE 1

| Field | Size | Value | Description |
|---|---|---|---|
| Attribute ID | 8 bits (1 octet) | TBD | Identifies the type of NAN attribute, ex. multicast attribute |
| Length | 16 bits (2 octets) | Variable | Length of the following fields in the attribute |

TABLE 1-continued

| Field | Size | Value | Description |
|---|---|---|---|
| Multicast Subscription Policy | 1 octet/ 2 bits | variable | Bit 0 and Bit 1 are defined for Active Subscription Policy 00: Active Subscription is required 01: Active Subscription is not required (Implicit Subscription) 10: Active Subscription is prohibited 11: reserved. Bit 2-Bit 7: reserved. |

In some embodiments, the indication indicates that active subscription/group joining is required before the multicast publisher 710 may complete subscription/group joining frame exchange with the multicast subscriber 720. The multicast publisher 710 can thus use the indication that active subscription is not required as a default indication. This permits the multicast publisher 710 to be able to determine whether there is at least one multicast subscriber 720 that has subscribed to the service or joined the group.

After the multicast publisher 710 completes the subscription/group joining frame exchange, the indication may continue to indicate that active subscription/group joining is required or can be switched to implicit subscription/group joining is implicit (to permit passive subscription) or no subscription/group joining is available. Thus, subsequent multicast subscribers may avoid a frame exchange with the multicast publisher 710, thereby reducing resource usage during subscription. On the other hand, the indication may continue to indicate that active subscription/group joining is required to permit the multicast publisher 710 to have an accurate count of the number of subscribers.

In some embodiments, the subscription policy change (and thus indication) may occur after a predetermined number (e.g., 1, 2 or 3) multicast subscribers have subscribed via a frame exchange with the multicast publisher 710 to ensure that at least one multicast subscriber has subscribed when another of the multicast subscribers that has performed a frame exchange with the multicast publisher 710 (registered) unsubscribes. In this case, when the multicast publisher 710 determines that the number of registered multicast subscribers has fallen below the predetermined number, the multicast publisher 710 may readjust the subscription policy to require active subscription/group joining. This may avoid an issue with the multicast publisher 710 not being able to determine whether at least one multicast subscriber has subscribed or is in the group. In some embodiments, hysteresis may be applied such that the initial change occurs at a predetermined number of multicast subscribers that is higher than the reversal (e.g., 3 to adjust from required to permitted/ implicit, and 1 to change back from permitted/implicit to required). After a different, higher predetermined number of subscription/group joining frame exchanges, the multicast publisher 710 may switch the indication to active subscription/group joining is prohibited from active subscription/ group joining is required or implicit subscription/group joining is implicit—either directly or indirectly jumping from required to prohibited. This may reduce the signaling overhead. Similarly, once the prohibited active subscription/ group joining number is reached, the indication may continue to indicate prohibiting active subscription/group joining until a number below the higher predetermined number is reached (e.g., 100 to adjust from required or permitted to prohibited, and 3 to change back from prohibited to required). Similarly, the multicast subscriber 720 may report QoS characteristics to the multicast publisher 710, which may be used instead or in addition to the number of subscribers to determine whether to change the indication. The QoS may have one or more thresholds similar to those above. The thresholds for the number of subscribers and/or QoS may change when both sets of thresholds are used to determine whether to change the indication.

In some embodiments, the indication may change from indicating that active subscription/group joining is required to indicating that implicit subscription is allowed and then to indicating that no subscription/group joining. The indication may subsequently remain indicating that no subscription/group joining before transitioning back to indicating that active subscription/group joining is required without again indicating that implicit subscription is allowed there between.

The above has focused on multicast service. For unicast service, all three indications can be used. An indication that active subscription and subscription is prohibited may, however, be more useful for unicast service. The subscription policy field can be disposed in a SDF or NDP for unicast connection setup. Similar to the multicast subscription shown in Table 1, the subscription policy field for unicast service may be one or two bits and use the same or a similar set of mappings as in Table 1. Also similar to a multicast publisher, a unicast publisher may use the indication active subscription required as a default indication. The unicast publisher can subsequently switch the indication to active subscription prohibited when a predetermined maximum number of subscribers is reached, which may be limited by the service or by the ability of the unicast publisher.

For each of the services indicated (unicast, multicast, broadcast), when the subscription policy changes, a predetermined set of rules may be defined. When the subscription policy switches from active subscription not being required to active subscription being required, STAs that have already subscribed to the service may be requested by the multicast publisher to re-subscribe to the service. This transmission may be a broadcast transmission to enable the resubscription request to reach all STAs. In some embodiments, the multicast publisher may determine that an excessive number of subscribers are present and/or that the QoS is below a minimum threshold and limit the number of subscribers to fewer than those subscribed prior to the resubscription transmission. The limitation may be on a "first come first served" basis or may be dependent on the STAs, e.g., the STAs may have different subscription priorities.

When subscription policy is switched from active to not required, STAs that intend to subscribe to the service may avoid the frame exchange used for subscription. STAs that have already subscribed may ignore the change, and not resubscribe. When subscription policy is switched from active/not required to prohibited, STAs that intend to subscribe to the service may terminate the transmission for subscription to save on network communications but continue to monitor subscription policy broadcasts for an update that permits the STAs to subscribe to the service.

Examples

Example 1 is an apparatus of a publisher, the apparatus comprising: memory; and processing circuitry, arranged to: retrieve, from the memory, a subscription policy for a multicast service of the publisher, the subscription policy comprising an indication that is selectable from among at least: active subscription or group joining required, or active subscription or group joining prohibited; and generate, for transmission in a Neighborhood Awareness Network (NAN) message, the indication to a subscriber to subscribe to the multicast service.

In Example 2, the subject matter of Example 1 optionally includes, wherein: the message is generated for transmission via a publish message in Further Availability Window advertised by the publisher.

In Example 3, the subject matter of any one or more of Examples 1-2 optionally include, wherein the subscription policy indicates a subscription type that indicates a type of service is multicast and a policy indicated by the indication.

In Example 4, the subject matter of any one or more of Examples 1-3 optionally include, wherein a default subscription policy, applied when otherwise unspecified, is active subscription or group joining required.

In Example 5, the subject matter of any one or more of Examples 1-4 optionally include, wherein when the indication indicates active subscription is required, a frame exchange between the subscriber and the publisher is to be used to subscribe the subscriber to the multicast service.

In Example 6, the subject matter of any one or more of Examples 1-5 optionally include, wherein: the indication is further selectable from implicit subscription is allowed, and when the indication indicates that implicit subscription is allowed, the subscriber is allowed to subscribe to the multicast service implicitly without a frame exchange.

In Example 7, the subject matter of any one or more of Examples 1-6 optionally include, wherein when the indication indicates active subscription is prohibited, a frame exchange is avoided between the subscriber and the publisher for the subscriber to subscribe to the multicast service.

In Example 8, the subject matter of any one or more of Examples 1-7 optionally include, wherein: the indication is further selectable from implicit subscription is allowed, and the processing circuitry is further arranged to generate a subscription policy update having a new indication after active subscription by an initial active subscriber to ensure that the multicast service is subscribed to by at most the initial active subscriber, the indication being active subscription or group joining required and the new indication being implicit subscription allowed.

In Example 9, the subject matter of Example 8 optionally includes, wherein the processing circuitry is further arranged to: generate a subscription policy update having a new indication after a number of active subscribers falls below a predetermined threshold number of subscribers, the indication being one of implicit subscription or subscription/group joining is prohibited and the new indication being active subscription or group joining required.

In Example 10, the subject matter of any one or more of Examples 1-9 optionally include, wherein: the subscription policy is indicated in a multicast attribute carried in at least one of a service discovery frame (SDF), a NAN management frame or a public action frame for multicast request and multicast response, and the indication is provided using a plurality of bits.

In Example 11, the subject matter of any one or more of Examples 1-10 optionally include, wherein the processing circuitry is further arranged to: generate a subscription policy update having a new indication after active subscription by a predetermined number of subscribers, the new indication being active subscription or group joining prohibited.

In Example 12, the subject matter of any one or more of Examples 1-11 optionally include, further comprising: an antenna configured to transmit the subscription policy to the subscriber.

Example 13 is a method of communicating a subscription policy, the method comprising: receiving from a publisher a subscription policy for a service in a Neighborhood Awareness Network (NAN), the subscription policy comprising an indication selectable from active subscription or group joining required, implicit subscription allowed, or subscription or group joining prohibited, the subscription policy being updatable to provide a different indication; and subscribing to the service using the subscription policy indicated by the indication, the service selected from among a multicast service, a unicast service and a broadcast service.

In Example 14, the subject matter of Example 13 optionally includes, wherein the subscription policy indicates a subscription type that indicates a type of service as one of multicast, unicast and broadcast and a policy indicated by the indication.

In Example 15, the subject matter of any one or more of Examples 13-14 optionally include, wherein the method further comprises: engaging in a frame exchange to subscribe to the multicast service when the indication indicates active subscription is required.

In Example 16, the subject matter of any one or more of Examples 13-15 optionally include, wherein the method further comprises: determining whether to engage in a frame exchange to subscribe to the multicast service when the indication indicates implicit subscription allowed, and avoiding a frame exchange to subscribe to the multicast service when the indication indicates active subscription is prohibited.

In Example 17, the subject matter of any one or more of Examples 13-16 optionally include, wherein the method further comprises at least one of: receiving a first subscription policy update having a first indication after active subscription by the subscriber to ensure that the multicast service is subscribed to by at most the subscriber, the indication being active subscription or group joining required and the first indication being implicit subscription allowed, receiving a second subscription policy update having a second indication after a number of active subscribers falls below a predetermined threshold number of subscribers, the indication being one of subscription or group joining prohibited or implicit subscription allowed and the second indication being active subscription or group joining required, or receiving a third subscription policy update having a third indication after active subscription by a predetermined number of subscribers, the third indication being subscription or group joining prohibited.

In Example 18, the subject matter of any one or more of Examples 13-17 optionally include, wherein the method further comprises receiving a request to re-subscribe to the multicast service when the indication switches from implicit subscription allowed to active subscription required.

Example 19 is a non-transitory computer-readable storage medium that stores instructions for execution by one or more processors of a subscriber to configure the subscriber to: receive, from a publisher in a Neighborhood Awareness Network (NAN), a subscription policy for a multicast service, the subscription policy comprising an indication selectable from active subscription or group joining required, implicit subscription allowed, or subscription or group joining prohibited; and receive from a publisher a subscription policy update when a predetermined set of network or subscription conditions is met.

In Example 20, the subject matter of Example 19 optionally includes, wherein the instructions further configure the subscriber to: engage in a frame exchange to subscribe to the multicast service when the indication indicates active subscription or group joining is required, determine whether to engage in a frame exchange to subscribe to the multicast service when the indication indicates implicit subscription is allowed, and avoid a frame exchange to subscribe to the multicast service when the indication indicates active subscription is prohibited.

In Example 21, the subject matter of any one or more of Examples 19-20 optionally include, wherein the instructions further configure the subscriber to at least one of: receive a first subscription policy update having a first indication after active subscription by the subscriber to ensure that the multicast service is subscribed to by at most the subscriber, the indication being active subscription or group joining required and the first indication being implicit subscription allowed, receive a second subscription policy update having a second indication after a number of active subscribers falls below a predetermined threshold number of subscribers, the indication being one of subscription or group joining prohibited or implicit subscription allowed and the second indication being active subscription or group joining required, or receive a third subscription policy update having a third indication after active subscription by a predetermined number of subscribers, the third indication being subscription or group joining prohibited.

In Example 22, the subject matter of any one or more of Examples 19-21 optionally include, wherein the instructions further configure the subscriber to receive a request to re-subscribe to the multicast service when the indication switches from implicit subscription allowed to active subscription required.

In Example 23, the subject matter of any one or more of Examples 19-22 optionally include, wherein the predetermined set of network or subscription conditions comprise at least one of a minimum or maximum threshold number of active subscribers or a quality of service (QoS) being reached.

Example 24 is an apparatus of a subscriber, the apparatus comprising: means for receiving, from a publisher in a Neighborhood Awareness Network (NAN), a subscription policy for a multicast service, the subscription policy comprising an indication selectable from active subscription or group joining required, implicit subscription allowed, or subscription or group joining prohibited; and means for receiving from a publisher a subscription policy update when a predetermined set of network or subscription conditions is met.

In Example 25, the subject matter of Example 24 optionally includes, further comprising: means for engaging in a frame exchange to subscribe to the multicast service when the indication indicates active subscription or group joining is required, means for determining whether to engage in a frame exchange to subscribe to the multicast service when the indication indicates implicit subscription is allowed, and means for avoiding a frame exchange to subscribe to the multicast service when the indication indicates active subscription is prohibited.

In Example 26, the subject matter of any one or more of Examples 24-25 optionally include, further comprising at least one of: means for receiving a first subscription policy update having a first indication after active subscription by the subscriber to ensure that the multicast service is subscribed to by at most the subscriber, the indication being active subscription or group joining required and the first indication being implicit subscription allowed, means for receiving a second subscription policy update having a second indication after a number of active subscribers falls below a predetermined threshold number of subscribers, the indication being one of subscription or group joining prohibited or implicit subscription allowed and the second indication being active subscription or group joining required, or means for receiving a third subscription policy update having a third indication after active subscription by a predetermined number of subscribers, the third indication being subscription or group joining prohibited.

In Example 27, the subject matter of any one or more of Examples 24-26 optionally include, further comprising means for receiving a request to re-subscribe to the multicast service when the indication switches from implicit subscription allowed to active subscription required.

In Example 28, the subject matter of any one or more of Examples 24-27 optionally include, wherein the predetermined set of network or subscription conditions comprise at least one of a minimum or maximum threshold number of active subscribers or a quality of service (QoS) being reached.

Example 29 is an apparatus of a publisher, the apparatus comprising: means for storing a subscription policy for a multicast service of the publisher, the subscription policy comprising an indication that is selectable from among at least: active subscription or group joining required or active subscription or group joining prohibited; and means for generating, for transmission in a Neighborhood Awareness Network (NAN) message, the indication to a subscriber to subscribe to the multicast service.

In Example 30, the subject matter of Example 29 optionally includes, wherein the subscription policy indicates a subscription type that indicates a type of service is multicast and a policy indicated by the indication.

In Example 31, the subject matter of any one or more of Examples 29-30 optionally include, wherein a default subscription policy, applied when otherwise unspecified, is active subscription or group joining required.

In Example 32, the subject matter of any one or more of Examples 29-31 optionally include, wherein when the indication indicates active subscription is required, a frame exchange between the subscriber and the publisher is to be used to subscribe the subscriber to the multicast service.

In Example 33, the subject matter of any one or more of Examples 29-32 optionally include, wherein: the indication is further selectable from implicit subscription is allowed, and when the indication indicates that implicit subscription is allowed, the subscriber is allowed to subscribe to the multicast service implicitly without a frame exchange.

In Example 34, the subject matter of any one or more of Examples 29-33 optionally include, wherein when the indication indicates active subscription is prohibited, a frame exchange is avoided between the subscriber and the publisher for the subscriber to subscribe to the multicast service.

In Example 35, the subject matter of any one or more of Examples 29-34 optionally include, wherein: the indication is further selectable from implicit subscription is allowed, and the processing circuitry is further arranged to generate a subscription policy update having a new indication after active subscription by an initial active subscriber to ensure that the multicast service is subscribed to by at most the initial active subscriber, the indication being active subscription or group joining required and the new indication being implicit subscription allowed.

In Example 36, the subject matter of Example 35 optionally includes, further comprising: means for generating a subscription policy update having a new indication after a number of active subscribers falls below a predetermined threshold number of subscribers, the indication being one of implicit subscription or subscription/group joining is prohibited and the new indication being active subscription or group joining required.

In Example 37, the subject matter of any one or more of Examples 29-36 optionally include, wherein: the subscription policy is indicated in a multicast attribute carried in at least one of a service discovery frame (SDF), a NAN management frame or a public action frame for multicast request and multicast response, and the indication is provided using a plurality of bits.

In Example 38, the subject matter of any one or more of Examples 29-37 optionally include, further comprising: means for generating a subscription policy update having a new indication after active subscription by a predetermined number of subscribers, the new indication being active subscription or group joining prohibited.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The invention claimed is:

1. An apparatus of a wireless communication station (STA) configured to operate as a publisher, the apparatus comprising:
   memory; and
   processing circuitry, arranged to:

retrieve, from the memory, a subscription policy for a multicast service of the publisher, the subscription policy comprising an indication that is selectable from among:
   active subscription/group joining required, in which a frame exchange between a subscriber and the publisher is to be used to subscribe the subscriber to the multicast service, and
   active subscription/group joining prohibited, in which a frame exchange is avoided between the subscriber and the publisher for the subscriber to subscribe to the multicast service; and
   encode, for transmission in a Neighborhood Awareness Network (NAN) message, the indication to the subscriber to subscribe to the multicast service.

2. The apparatus of claim 1, wherein:
the message is generated for transmission via a publish message in Further Availability Window advertised by the publisher.

3. The apparatus of claim 1, wherein the subscription policy indicates a subscription type that indicates a type of service is multicast and a policy indicated by the indication.

4. The apparatus of claim 1, wherein a default subscription policy, applied when otherwise unspecified, is active subscription/group joining required.

5. The apparatus of claim 1, wherein:
the indication is further selectable from implicit subscription is allowed, and
when the indication indicates that implicit subscription is allowed, the subscriber is allowed to subscribe to the multicast service implicitly without a frame exchange.

6. The apparatus of claim 1, wherein:
the indication is further selectable from implicit subscription is allowed, and
the processing circuitry is further arranged to generate a subscription policy update having a new indication after active subscription by an initial active subscriber to ensure that the multicast service is subscribed to by at most the initial active subscriber, the indication being active subscription or group joining required and the new indication being implicit subscription allowed.

7. The apparatus of claim 6, wherein the processing circuitry is further arranged to:
generate a subscription policy update having a new indication after a number of active subscribers falls below a predetermined threshold number of subscribers, the indication being one of implicit subscription or subscription/group joining is prohibited and the new indication being active subscription/group joining required.

8. The apparatus of claim 1, wherein:
the subscription policy is indicated in a multicast attribute carried in at least one of a service discovery frame (SDF), a NAN management frame or a public action frame for multicast request and multicast response, and the indication is provided using a plurality of bits.

9. The apparatus of claim 1, wherein the processing circuitry is further arranged to:
generate a subscription policy update having a new indication after active subscription by a predetermined number of subscribers, the new indication being active subscription/group joining prohibited.

10. The apparatus of claim 1, further comprising:
an antenna configured to transmit the subscription policy to the subscriber.

11. A method of communicating a subscription policy, the method comprising:

receiving from a publisher a subscription policy for a service in a Neighborhood Awareness Network (NAN), the subscription policy comprising an indication selectable from active subscription/group joining required, implicit subscription allowed, or active subscription/group joining prohibited, the subscription policy being updatable to provide a different indication; and
subscribing to the service using the subscription policy indicated by the indication, the service selected from among a multicast service, a unicast service and a broadcast service,
wherein the method further comprises:
   engaging in a frame exchange to subscribe to the multicast service when the indication indicates active subscription/group joining is required,
   determining whether to engage in the frame exchange to subscribe to the multicast service when the indication indicates implicit subscription is allowed, and
   avoiding the frame exchange to subscribe to the multicast service when the indication indicates active subscription is prohibited.

12. The method of claim 11, wherein the subscription policy indicates a subscription type that indicates a type of service as one of multicast, unicast and broadcast and a policy indicated by the indication.

13. The method of claim 11, wherein the method further comprises at least one of:
   receiving a first subscription policy update having a first indication after active subscription by the subscriber to ensure that the multicast service is subscribed to by at most the subscriber, the indication being active subscription/group joining required and the first indication being implicit subscription allowed,
   receiving a second subscription policy update having a second indication after a number of active subscribers falls below a predetermined threshold number of subscribers, the indication being one of subscription or group joining prohibited or implicit subscription allowed and the second indication being active subscription/group joining required, or
   receiving a third subscription policy update having a third indication after active subscription by a predetermined number of subscribers, the third indication being active subscription/group joining prohibited.

14. The method of claim 11, wherein the method further comprises receiving a request to re-subscribe to the multicast service when the indication switches from implicit subscription allowed to active subscription required.

15. A non-transitory computer-readable storage medium that stores instructions for execution by one or more processors of a subscriber to configure the subscriber to:
   receive, from a publisher in a Neighborhood Awareness Network (NAN), a subscription policy for a multicast service, the subscription policy comprising an indication selectable from active subscription/group joining required, implicit subscription allowed, or active subscription/group joining prohibited; and
   receive from a publisher a subscription policy update when a predetermined set of network or subscription conditions is met,
   wherein the instructions further configure the subscriber to:
      engage in a frame exchange to subscribe to the multicast service when the indication indicates active subscription/group joining is required, determine whether to engage in the frame exchange to subscribe to the multicast service when the indication indicates implicit subscription is allowed, and avoid the frame exchange to subscribe to the multicast service when the indication indicates active subscription is prohibited.

16. The medium of claim 15, wherein the instructions further configure the subscriber to at least one of:

receive a first subscription policy update having a first indication after active subscription by the subscriber to ensure that the multicast service is subscribed to by at most the subscriber, the indication being active subscription/group joining required and the first indication being implicit subscription allowed, receive a second subscription policy update having a second indication after a number of active subscribers falls below a predetermined threshold number of subscribers, the indication being one of active subscription/group joining prohibited or implicit subscription allowed and the second indication being active subscription/group joining required, or receive a third subscription policy update having a third indication after active subscription by a predetermined number of subscribers, the third indication being active subscription/group joining prohibited.

17. The medium of claim 15, wherein the instructions further configure the subscriber to receive a request to re-subscribe to the multicast service when the indication switches from implicit subscription allowed to active subscription required.

18. The medium of claim 15, wherein the predetermined set of network or subscription conditions comprise at least one of a minimum or maximum threshold number of active subscribers or a quality of service (QoS) being reached.

* * * * *